United States Patent
Francke et al.

(10) Patent No.: US 6,385,282 B1
(45) Date of Patent: May 7, 2002

(54) RADIATION DETECTOR AND AN APPARATUS FOR USE IN RADIOGRAPHY

(75) Inventors: Tom Francke, Sollentuna; Vladimir Peskov, Stockholm; Christer Ullberg, Sollentuna, all of (SE)

(73) Assignee: Xcounter AB, Danderyd (SE)

( * ) Notice: Subject to any disclaimer, the term of this patent is extended or adjusted under 35 U.S.C. 154(b) by 0 days.

(21) Appl. No.: 09/443,320

(22) Filed: Nov. 19, 1999

(30) Foreign Application Priority Data

Apr. 14, 1999 (SE) .............................................. 9901327

(51) Int. Cl.$^7$ ............................................... G01F 1/66
(52) U.S. Cl. ...................... 378/51; 250/374; 250/385.1
(58) Field of Search ........................... 378/51; 250/374, 250/385.1, 370.13

(56) References Cited

U.S. PATENT DOCUMENTS

| | | | |
|---|---|---|---|
| 4,479,059 A | * 10/1984 | Morris et al. | |
| 5,164,809 A | * 11/1992 | Street et al. | |
| 5,347,131 A | * 9/1994 | Charpak | 250/385.1 |
| 5,521,956 A | * 5/1996 | Charpak | 378/146 |
| 5,731,584 A | * 3/1998 | Beyne et al. | 250/374 |
| 5,844,291 A | * 12/1998 | Antich et al. | 257/438 |
| 6,011,265 A | * 1/2000 | Sauli | 250/374 |
| 6,072,181 A | * 6/2000 | Hassard et al. | |
| 6,118,125 A | * 9/2000 | Carson et al. | 250/385.1 |
| 6,175,120 B1 | * 1/2001 | McGregor et al. | |
| 6,222,209 B1 | * 4/2001 | Antich et al. | 257/156 |

FOREIGN PATENT DOCUMENTS

| | | |
|---|---|---|
| EP | 0810631 | 3/1997 |
| WO | 9923859 | 5/1999 |

* cited by examiner

Primary Examiner—David P. Porta
Assistant Examiner—Pamela R. Hobden
(74) Attorney, Agent, or Firm—Birch, Stewart, Kolasch & Birch, LLP

(57) ABSTRACT

A detector for detection of ionizing radiation, and an apparatus for use in planar beam radiography, including such a detector. The detector includes a chamber filled with an ionizable gas. First and second electrode arrangements are provided in the chamber with a space therebetween. The space includes a conversion volume, an electron avalanche amplification unit arranged in the chamber, and at least one arrangement of read-out elements for detection of electron avalanches. To reduce the effect of possible spark discharges in the chamber, at least one of the first and second electrode arrangements includes a resistive material having a surface facing the other electrode arrangement.

18 Claims, 5 Drawing Sheets

RADIATION DETECTOR AND AN APPARATUS FOR USE IN RADIOGRAPHY

BACKGROUND OF THE INVENTION

1. Field of the Invention

The invention relates to a detector for detection of ionizing radiation and to an apparatus for use in planar beam radiography

2. Description of Related Art

A detector and an apparatus of the kind mentioned above are described in copending U.S. application Ser. No. 08/969, 554, now U.S. Pat. No. 6,118,125 and copending U.S. application Ser. Nos. 09/443,292, 09/443,294, 09/443,321 and 09/444,569, which are incorporated herein by reference. Another detector and apparatus of the kind mentioned above is disclosed in EP-A1-0 810 631.

The main advantages with gaseous detectors, compared to solid state detectors, are that they are cheap to manufacture and that they can employ gas multiplication to strongly (on orders of magnitude) amplify the signal amplitudes. However, in the gaseous detector, spark discharges can occur in the gas volumes of the detector, due to the strong electric fields created in the detector. Such spark discharges block the detector for a period of time, and can also be harmful for the detector and the electronics.

SUMMARY OF THE INVENTION

The present invention is directed to a detector for detection of ionizing radiation, which employs avalanche amplification, and limits the problems caused by spark discharges.

This and other objects are attained by a detector for detection of ionizing radiation, comprising:
- a chamber filled with an ionizable gas,
- first and second electrode arrangements provided in said chamber with a space between them, said space including a conversion volume, wherein
- at least one of the first and second electrode arrangements comprising a resistive material having a surface facing the other electrode arrangement
- an electron avalanche amplification unit arranged between the first and second electrode arrangements, and
- at least one of the first and second electric arrangements including read-out elements for detecting electron avalanches.

The present invention is also directed to an apparatus for use in planar beam radiography, comprising at least one detector for detection of ionizing radiation, which employs avalanche amplification, and limits the problems caused by spark discharges.

This and other objects are attained by an apparatus for use in planar beam radiography, comprising
- an X-ray source,
- a substantially planar beam unit for forming a substantially planar X-ray beam positioned between said X-ray source and an object to be imaged,
- a chamber filled with an ionizable gas,
- first and second electrode arrangements provided in said chamber with a space between them, said space including a conversion volume, wherein
- at least one of the first and second electrode arrangements comprising a resistive material having a surface facing the other electrode arrangement,
- an electron avalanche amplification unit arranged between the first and second electrode arrangements, and
- at least one of the first and second electric arrangements including read-out elements for detecting electron avalanches.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1A:
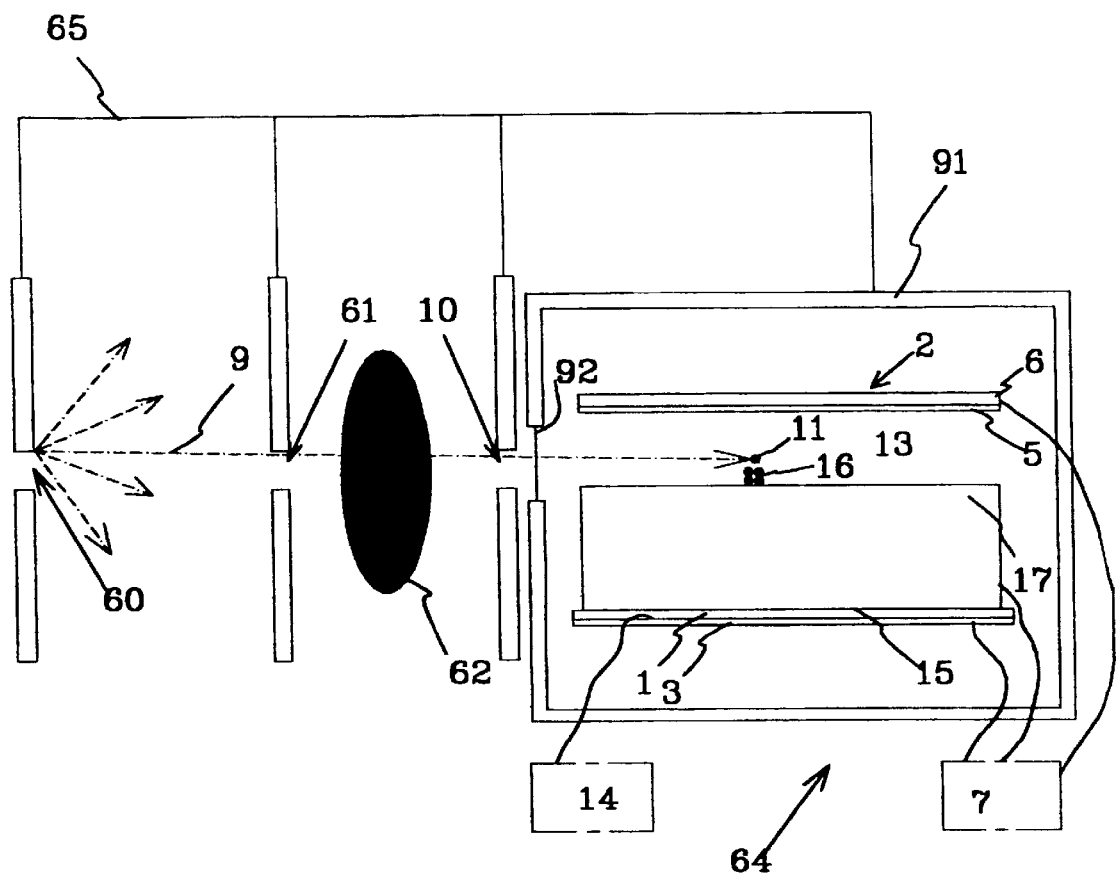
FIG. 1a illustrates schematically, in an overall view, an apparatus for planar beam radiography, in which a detector according to the invention can be used.

FIG. 1a is a sectional view in a plane orthogonal to the plane of a planar X-ray beam 9 of an apparatus for planar beam radiography, in which the invention can be used. The apparatus includes an X-ray source 60, which in combination with a first thin collimator window 61 produces a planar fan-shaped X-ray beam 9, for irradiation of an object 62 to be imaged. The beam transmitted through the object 62 enters a detector 64. Optionally a thin slit or second collimator window 10, which is aligned with the X-ray beam forms the entrance for the X-ray beam 9 to the detector 64. A major fraction of the incident X-ray photons are detected in the detector 64, which includes a conversion and drift volume 13, and electron avalanche amplification unit 17, and is oriented so that the X-ray photons enter sideways between two electrode arrangements 1, 2, between which an electric field for drift of electrons and ions in the conversion and drift volume 13 is created. The X-ray source 60, the first thin collimator window 61, the optional collimator window 10 and the detector 64 are connected and fixed in relation to each other by, for example, a frame or support 65. The so formed apparatus for radiography can be moved as a unit to scan an object, which is to be examined.

In this application the planar X-ray beam is a beam that is collimated, e.g. by collimator 61.

The detector 64 includes a first drift electrode arrangement being a cathode plate 2 and a second drift electrode arrangement being an anode plate 1. They are mutually parallel and the space in between includes a thin gas-filled gap or region 13, being a conversion and drift volume, and an electron avalanche amplification unit 17. Alternatively the plates are non-parallel. A voltage is applied between the anode plate 1 and the cathode plate 2, and one or several voltages is (are) applied on the electron avalanche amplification unit 17. This results in a drift field causing drift of electrons and ions in the gap 13, and an electron avalanche amplification field or electron avalanche amplification fields in the electron avalanche amplification unit 17. In connection with the anode plate 1 is an arrangement 15 of read-out elements for detection of electron avalanches provided. Preferably the arrangement 15 of read-out elements also constitutes the anode electrode. Alternatively the arrangement 15 of read-out elements can be formed in connection with the cathode plate 2 or the electron avalanche amplification unit 17. It can also be formed on the anode or cathode plate separated from the anode or cathode electrode by a dielectric layer or substrate. In this case it is necessary that the anode or cathode electrode is semi-transparent to induced pulses, e.g. formed as strips or pads.

As seen, the X-rays to be detected are incident sideways on the detector and enter the conversion and drift volume 13 between the cathode plate 2 and the anode plate 1. The X-rays enter the detector preferably in a direction parallel to the anode plate 1, and may enter the detector through a thin slit or collimator window 10. In this way, the detector can easily be made with an interaction path long enough to allow a major fraction of the incident X-ray photons to interact and be detected. In the case a collimator is used, this should preferably be arranged so that the thin planar beam enters the detector close to the electron avalanche amplification unit 17 and parallel therewith.

The gap or region 13 is filled with a gas, which can be a mixture of for example 90% krypton and 10% carbon dioxide or a mixture of for example 90% argon and 10% methane. The gas can be under pressure, preferably in a range 1–20 atm. Therefore, the detector includes a gas tight housing 91 with a slit entrance window 92, through which the X-ray beam 9 enters the detector. The window is made of a material, which is transparent to the radiation, e.g. Mylar®, or a thin aluminum foil;

In operation, the incident X-rays 9 enter the detector through the optional thin slit or collimator window 10, if present, close to the an electron avalanche amplification unit 17, and travel through the gas volume in a direction parallel to the electron avalanche amplification unit 17. Each X-ray photon produces a primary ionization electron-ion pair within the gas as a result of interaction with a gas atom. This production is caused by photoeffect, Compton-effect or Auger-effect. Each primary electron 11 produced loses its kinetic energy through interactions with new gas molecules, causing further production of electron-ion pairs (secondary ionization electron-ion pairs). Typically between a few hundred and thousand secondary ionization electron-ion pairs are produced from a 20 keV X-ray photon in this process. The secondary ionization electrons 16 (together with the primary ionization electron 11) will drift towards the electron avalanche amplification unit 17 due to the electric field in the conversion and drift volume 13. When the electrons enter the strong electric field, or regions of focused field lines of the electron avalanche amplification unit 17 they will undergo avalanche amplification, which will be described further below.

Figure 2A:
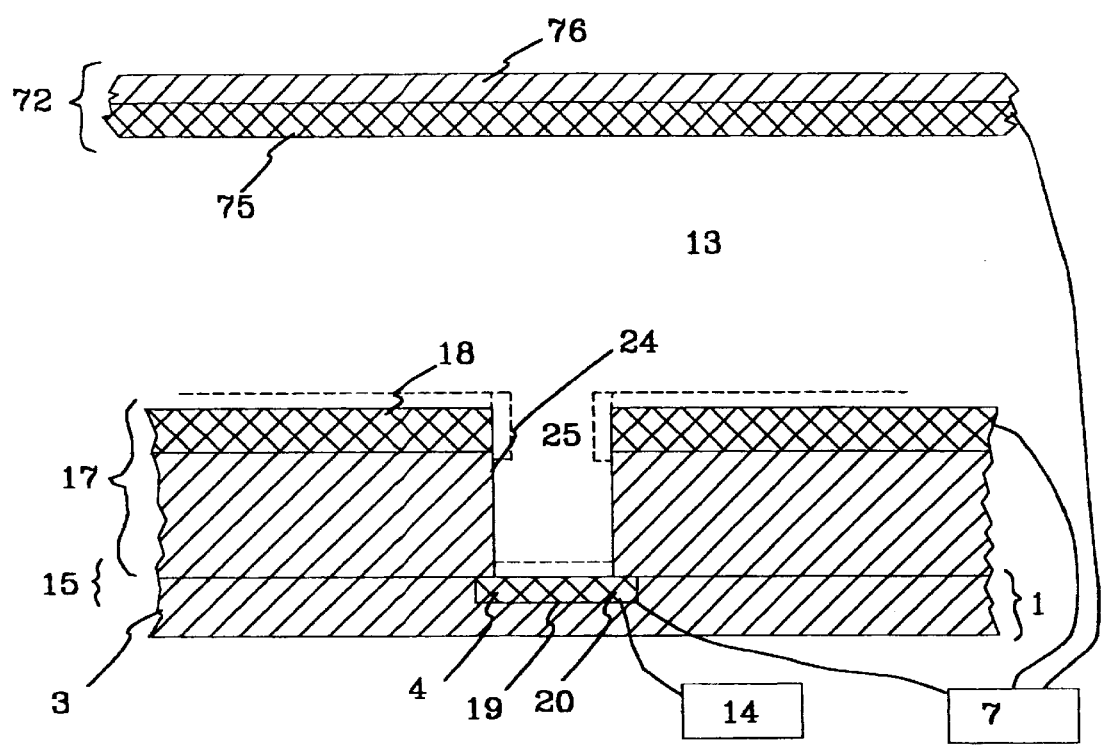
FIG. 2a is a schematic, partly enlarged, cross sectional view, taken at II—II in FIG. 1b, of a detector according to a first specific embodiment of the invention.
Figure 2B:
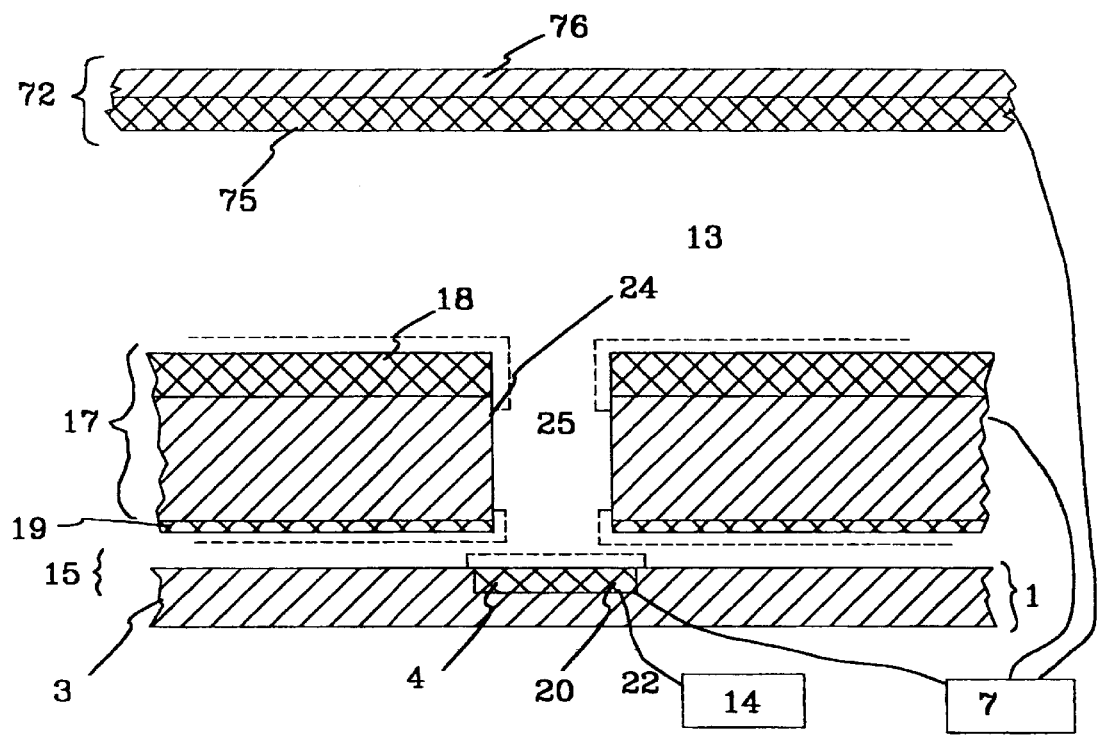
FIG. 2b is a schematic, partly enlarged, cross sectional view, taken at II—II in FIG. 1b, of a detector according to a second specific embodiment of the invention.

The movements of the avalanche electrons and ions induce electrical signals in the read-out elements 20 as illustrated in FIGS. 2a and 2b for detection of electron avalanches. Those signals are picked up in connection with the electron avalanche amplification unit 17, the cathode plate 2 or the anode plate 1, or a combination of two or more of said locations. The signals are further amplified and processed by readout circuitry 14 to obtain accurate measurements of the X-ray photon interaction points, and optionally the X-ray photon energies.

In the detector described in the above-mentioned U.S. Pat. No. 6,118,125, the cathode plate 2 comprises a dielectric substrate 6 and a conductive layer 5 being a cathode electrode. The anode 1 comprises a dielectric substrate 3 and a conductive layer 4 being a cathode electrode. Due to the high electric field strengths that can occur in connection with the electrode plates there is a risk that spark discharges occur in the gas. Such spark discharges block the detector for a period of time, and can also be harmful for the detector and the electronics.

Figure 1B:
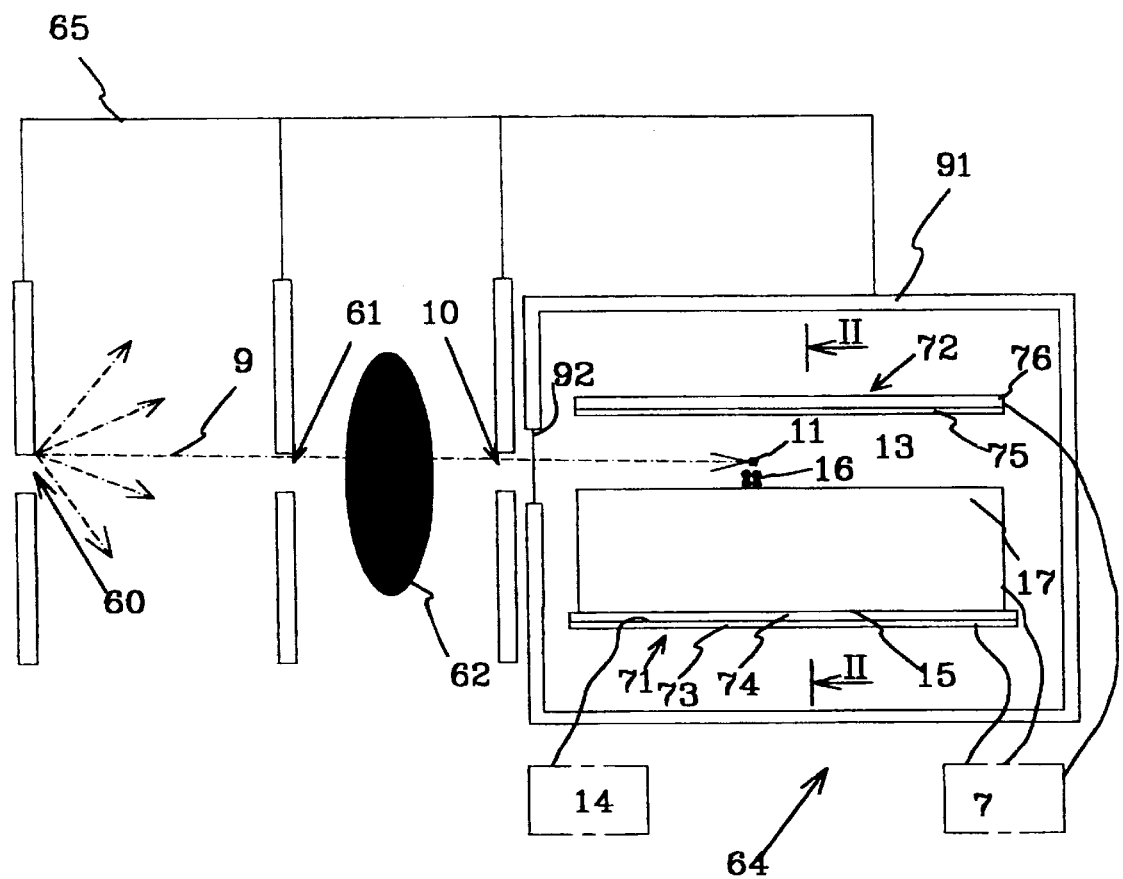
FIG. 1b illustrates schematically, in an overall view, an apparatus for planar beam radiography, according to a general embodiment of the invention.

In FIG. 1b a detector according to the invention is shown. Here the anode 71 comprises a conductive layer 73 carried by a resistive layer 74 and the cathode 72 comprises a conductive layer 76 carried by a resistive layer 75. By this arrangement the resistive layers face the drift and conversion volume or the electron avalanche amplification unit 17, where strong electric fields can occur. Hereby it is obtained that in case a spark discharge occurs, the power in the spark discharge is reduced. Thus the effects due to the same can be controlled. The resistive layer can be formed as a substrate acting as a carrier for the conductive layer, and be made of e.g. silicon monoxide, conductive glass or diamond. The spark discharges mostly occur in the vicinity of the anode 71. Therefore, it can be sufficient if only the anode 71 includes a resistive layer, and the cathode 72 is formed as in FIG. 1a. The other parts of the detector shown in FIG. 1b are the same or similar to those of FIG. 1a.

FIG. 2a shows a schematic, partly enlarged, cross sectional view, taken at II—II in FIG. 1b, of a detector according to a first specific embodiment of the invention. The cathode plate 72 comprises a resistive substrate 75 and a conductive layer 76 together forming a cathode electrode, as mentioned above. The anode 1 comprises a dielectric substrate 3 and a conductive layer 4 being an anode electrode. Between the gap 13 and the anode 1 an electron avalanche amplification unit 17 is arranged. This amplification unit 17 includes an avalanche amplification cathode 18 and an avalanche amplification anode 19, separated by a dielectric 24. This could be a gas or a solid substrate 24 carrying the cathode 18 and the anode 19, as shown in the figure. Both or one of the cathode 18 and the anode 19 can be provided with a resistive layer on top of a conductive layer so that a surface of the resistive layer is in contact with the gas (shown with broken lines). Alternatively only one of the cathodes 72, 18 or anode 19 is provided with a resistive layer, preferably only the anode 19 (71). As seen, the anode electrodes 4 and 19 are formed by the same conductive element. Between the cathode 18 and the anode 19 a voltage is applied by a DC power supply 7 for creation of a very strong electric field in an avalanche amplification region 25. The avalanche region 25 is formed in a region between and around the edges of the avalanche cathode 18 which are facing each other, where a concentrated electric field will occur due to the applied voltages. The DC power supply 7 is also connected with the cathode 72. The voltages applied are selected so that a weaker electric field, drift field, is created over the gap 13. Electrons (primary and secondary electrons) released by interaction in the conversion and drift volume 13 will drift, due to the drift field, towards the amplification unit 17. They will enter the very strong avalanche amplification fields and be accelerated. The accelerated electrons 11, 16 will interact with other gas atoms in the region 25 causing further electron-ion pairs to be produced. Those produced electrons will also be accelerated in the field, and will interact with new gas atoms, causing further electron-ion pairs to be produced. This process continues during the travel of the electrons in the avalanche region towards the anode 19 and an electron avalanche is formed. After leaving the avalanche region the electrons will drift towards the anode 19. The electron avalanche may continue up to the anode 19 if the electric field is strong enough.

The avalanche region 25 is formed by an opening or channel in the cathode 18 and the dielectric substrate 24, if present. The opening or channel can be circular, seen from above, or continuous, longitudinally extending between two edges of the substrate 24, if present, and the cathode 18. In the case the openings or channels are circular when seen from above they are arranged in rows, each row of openings or channels including a plurality of circular openings or channels. A plurality of longitudinal openings or channels or rows of circular channels are formed beside each other, parallel with each other or with the incident X-rays. Alternatively, the circular openings or channels can be arranged in other patterns.

The anode electrodes 4, 19 also form read-out elements 20 in the form of strips provided in connection with the openings or channels forming the avalanche regions 25. Preferably one strip is arranged for each opening or channel or row of openings or channels. The strips could be divided into sections along their length, where one section could be provided for each circular opening or channel or for a plurality of openings or channels, in the form of pads. The strips and the sections, if present, are electrically insulated from each other. Each detector electrode element i.e. strip or section is preferably separately connected to processing electronics 14. Alternatively, the read-out elements 20 can be located on the back side of the substrate (opposite the side of the anode electrodes 4, 19). In this case it is necessary that the anode electrodes 4, 19 are semi-transparent to induced pulses, e.g. in the form of strips or pads. In connection with FIGS. 2*b* and 2*c* below, different possible arrangements of read-out elements are shown.

As an example, the longitudinal channels can have a width in the range 0.01–1 mm, the circular channels can have a diameter of the circle in the range 0.01–1 mm, and the thickness of the dielectric 24 (separation between the avalanche cathode 18 and anode 19) is in the range 0.01–1 mm.

FIG. 2*b* shows a schematic, partly enlarged, cross sectional view, taken at II—II in FIG. 1*b*, of a detector according to a second specific embodiment of the invention. This embodiment differs from the embodiment according to FIG. 2*a* in that the anode electrodes 4 and 19 are formed by different conductive elements, being spaced by a dielectric, which could be solid or a gas. The openings or channels are also formed in the avalanche anode electrode 19. The avalanche amplification anode 19 is connected to the DC power supply 7. In the case the dielectric between the anode electrodes 4 and 19 is solid, it includes openings or channels through the dielectric, the openings or channels essentially corresponding to the openings or channels forming the avalanche regions 25. An electric field is created between the anode electrodes 4 and 19. This field could be a drift field, i.e. a weaker field, or an avalanche amplification field, i.e. a very strong electric field. Any or all of the cathode 72, 18 and the anode 4, 19 electrodes can be provided with a resistive layer on top of a conductive layer so that a surface of the resistive layer is in contact with the gas (shown with broken lines). Alternatively only one of the cathodes 72, 18 or anodes 4, 19 is provided with a resistive layer, preferably the anode 4.

Figure 2C:
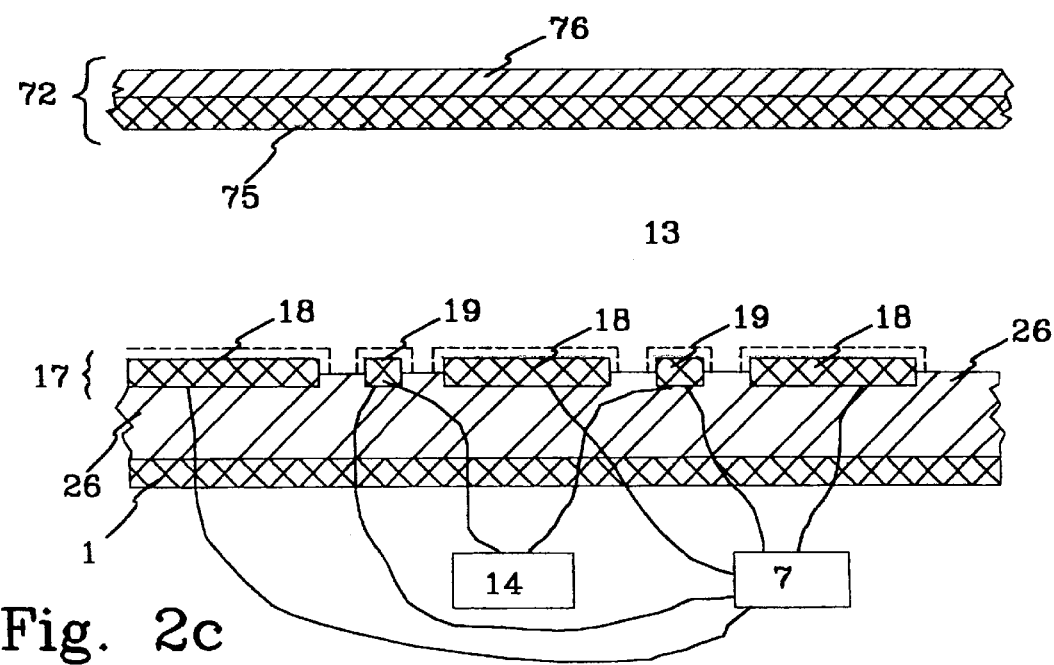
FIG. 2c is a schematic, partly enlarged, cross sectional view, taken at II—II in FIG. 1b, of a detector according to a third specific embodiment of the invention.

FIG. 2*c* shows a schematic, partly enlarged, cross sectional view, taken at II—II in FIG. 1*b*, of a detector according to a third specific embodiment of the invention. The detector includes a cathode 72, an anode 1, and an avalanche amplification unit 17. A gap 13 being a conversion and drift volume is provided between the cathode 72 and the avalanche amplification unit 17. The gap 13 is gas filled and the cathode 72 is formed as described above. The anode 1 is provided on a back surface of a dielectric substrate 26, e.g. a glass substrate. On the front surface of the substrate 26, avalanche amplification cathode 18 and anode 19 strips are alternately provided. The cathode 18 and anode 19 strips are conductive strips, and are connected to the DC power supply 7, for creation of a concentrated electric field, i.e. an avalanche amplification field in each region between a cathode strip 18 and an anode 19 strip. The anode 1 and cathode 72 are also connected to the DC power supply 7. The voltages applied are selected so that a weaker electric field, drift field, is created over the gap 13. Alternatively, the dielectric substrate 26 can be replaced by a gas. FIG. 2*a* illustrates that the avalanche amplification cathode 18, the avalanche amplification anode 19, and the dielectric 24 are supported by anode plate 1. In an arrangement such as the one shown in FIG. 2*b*, it may be necessary to provide supports for the avalanche amplification cathode 18, the avalanche amplification anode 19, and the dielectric 24, in order to maintain the space between the avalanche amplification anode 19 and the cathode 1. Such supports may be any type of structure known to one of ordinary skill in the art, such as brackets, pedestals, or any other variation, which would maintain the space between the avalanche amplification anode 19 and the anode plate 1.

Preferably the avalanche anode strips 19 also form the read-out elements 20, and are then connected to the processing electronics 14. The avalanche cathode strips 18 could instead form the read-out elements 20, or together with the anode strips 19. As an alternative, the anode electrode 1 can be constituted of strips, which can be segmented, and insulated from each other. Those strips could then form the read-out elements alone or together with the anode and/or cathode strips. The strips acting as anode/cathode and read-out elements are connected to the DC power supply 7 and the processing electronics 14, with appropriate couplings for separation. Any one of the set of cathode strips 18 and the set of anode strips 19 can be provided with a resistive layer on top of a conductive layer so that a surface of the resistive layer is in contact with the gas. Alternatively, only one of the cathode 72, the set of cathode strips 18 and the set of anode strips 19 is provided with a resistive layer. In a further alternative of an arrangement of read-out strips the read-out strips 20 are arranged under and parallel with the avalanche anode strips 19. The read-out strips 20 are then made a little wider than the avalanche anode strips 19. If they are located under the anode 1 it is necessary that the anode electrode is semi-transparent to induced pulses, e.g. in the form of strips or pads. In yet another alternative, the anode 1 can be omitted since the necessary electric fields can be created by means of the cathode electrodes 18 and the anode electrodes 19.

As an example, the glass substrate is about 0.1–5 mm thick. Further, the conductive cathode strip has a width of about 20–1000 µm and the conductive anode strip has a width of about 10–200 µm, with a pitch of about 50–2000 µm. Cathodes and anodes can be divided into segments along their extension.

In operation, X-ray photons enter the space 13 in the detector of FIG. 2c essentially parallel with the avalanche cathode 18 and anode 19 strips. In the conversion and drift volume 13 the incident X-ray photons are absorbed and electron-ion pairs are produced as described above. A cloud of primary and secondary electrons result from interactions caused by one X-ray photon drift towards the avalanche amplification unit 17. The electrons will enter the very strong electric field in the gas filled region between an anode strip and a cathode strip, which is an avalanche amplification region. In the strong electric field the electrons initiate electron avalanches. As a result, the number of electrons which is collected on the anode strips is of a few orders of magnitude higher than the number of primary and secondary electrons (so called gas multiplication). One advantage with this embodiment is that each electron avalanche only induces a signal on one anode element or essentially on one detector electrode element. The position resolution in one coordinate is therefore determined by the pitch.

Figure 2D:
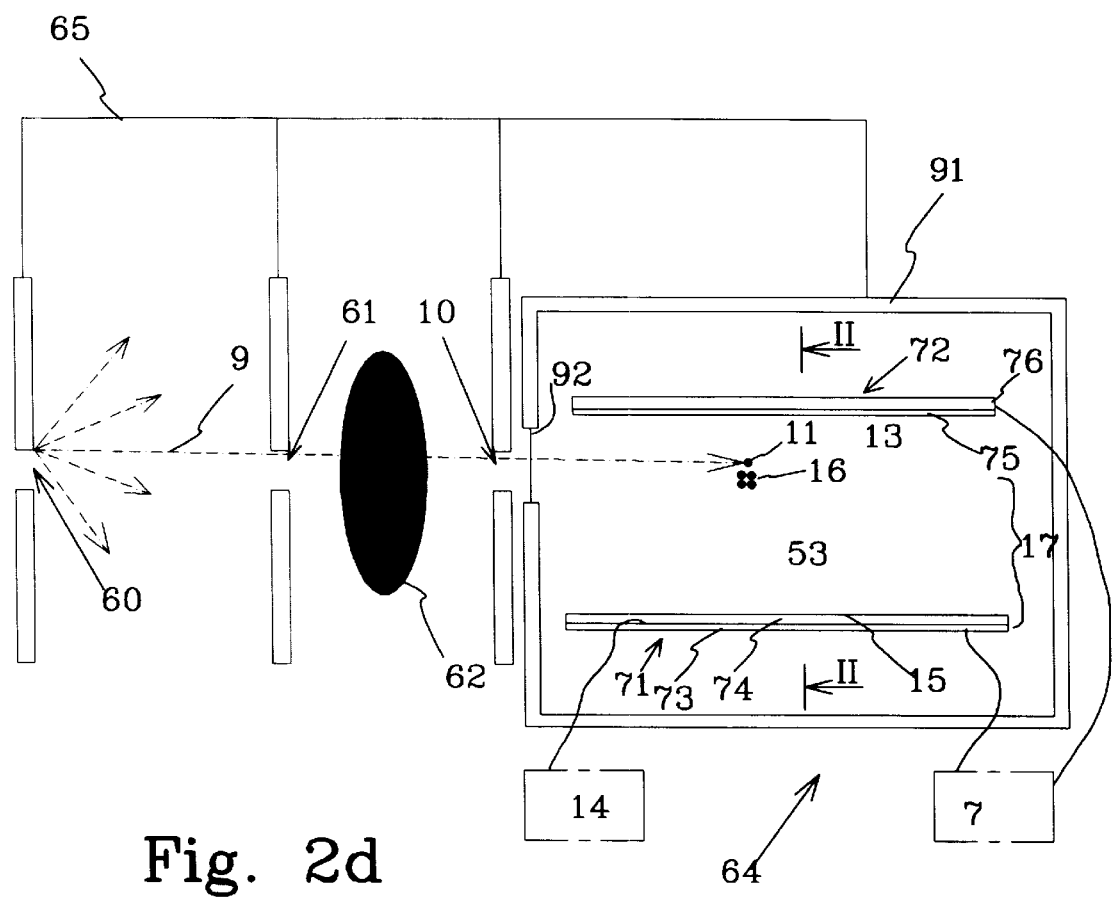
FIG. 2d illustrates schematically, in an overall view, an apparatus for planar beam radiography, including a detector according to a fourth specific embodiment of the invention.

FIG. 2d shows a schematic, sectional view similar to that of FIG. 1b, of a detector according to a fourth specific embodiment of the invention. A voltage is applied between the cathode 72 and the anode 71 for creation of a very strong electric field for avalanche amplification in the gap 13. The gap 13 will form a conversion and avalanche amplification volume. Each of the anode 71 and cathode 72 are provided with a resistive layer on top of a conductive layer so that a surface of the respective resistive layer is in contact with the gas. Alternatively, only one of the cathode 72, or anode 71 is provided with a resistive layer.

In operation, X-ray photons enter the space 13 in the detector of FIG. 2d essentially parallel with the anode 71 and close to the cathode 72. In the volume 13, the incident X-ray photons are absorbed and electron-ion pairs are produced as described above. A cloud of primary and secondary electrons, being the result of interactions caused by one X-ray photon, is produced. The strong electric field in the volume 13 will cause the electrons to initiate electron avalanches. Since the photons travel parallel with the anode 1, and the electric field is uniform, the avalanche amplification will be uniform in the detector. Read-out elements are arranged separately in connection with and insulated from the anode 71 or cathode or are included in anode or cathode electrodes, as described in the other embodiments.

Figure 3:
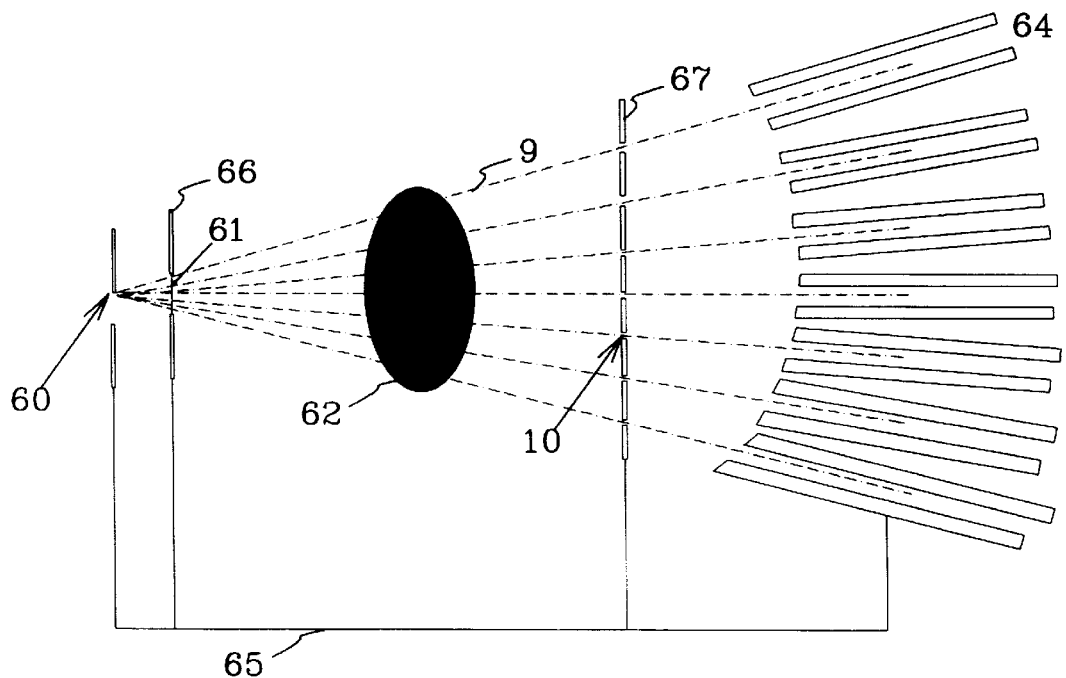
FIG. 3 is a schematic cross-sectional view of an embodiment according to the invention, with stacked detectors.

FIG. 3 shows schematically an embodiment of the invention with a plurality of the inventive detectors 64 stacked, one on top of another. By this embodiment, a multiline scan can be achieved, which reduces the overall scanning distance, as well as the scanning time. The apparatus of this embodiment includes an X-ray source 60, which together with a number of collimator windows 61 produce a number of planar fan-shaped X-ray beams 9, for irradiation of the object 62 to be imaged. The beams transmitted through the object 62 optionally enter the individual stacked detectors 64 through a number of second collimator windows 10, which are aligned with the X-ray beams. The first collimator windows 61 are arranged in a first rigid structure 66, and the optional second collimator windows 10 are arranged in a second rigid structure 67 attached to the detectors 64, or arranged separately on the detectors.

The X-ray source 60, the rigid structure 66, and the possible structure 67 including collimator windows 61, 10, respectively, and the stacked detectors 64, which are fixed to each other, are connected and fixed in relation to each other by for example a frame or support 65. The so formed apparatus for radiography can be moved as a unit to scan an object, which is to be examined. In this multiline configuration, the scanning can be done in a transverse direction, perpendicular to the X-ray beam, as mentioned above. It can also be advantageous if the apparatus for radiography is fixed and the object to be imaged is moved.

A further advantage of using a stacked configuration, compared to large single volume gas detectors, is reduction of background noise caused by X-ray photons scattered in the object 62. These scattered X-ray photons travelling in directions not parallel to the incident X-ray beam could cause "false" signals or avalanches in one of the other detectors 64 in the stack, if passing through anode and cathode plates and entering such a chamber. This reduction is achieved by significant absorption of (scattered) X-ray photons in the material of the anode and the cathode plates, or the collimator 67.

In the embodiments where the gas volumes can be made thin, this results in a fast removal of ions, which leads to low or no accumulation of space charges. This makes operation at high rate possible.

In the embodiments the distances can be kept small. This leads to low operating voltages, which results in low energy in possible sparks, which is favorable for the electronics.

The focusing of the field lines in the embodiments is also favorable for suppressing streamer formations. This leads to a reduced risk for sparks.

Generally, for all embodiments of the invention, the resistivity of the resistive layer should be kept low enough to accept a high rate and still high enough to protect the electrodes against sparks.

Although the invention has been described in conjunction with a number of preferred embodiments, it is to be understanding that various modifications may still be made without departing from the spirit and scope of the invention, as defined by the appended claims. For example, although the invention has been described in connection with detectors where the radiation is incident from the side, the invention could be used for detectors where the radiation is incident in any direction. Further, the voltages can be applied in other ways than described as long as the described electrical fields are created.

What is claimed is:

1. A detector for detection of ionizing radiation, comprising:

a chamber filled with an ionizable gas;

first and second electrode arrangements provided in said chamber with a space therebetween, said space including a conversion volume, and at least one of said first and second electrode arrangements includes at least one resistive layer facing the other of said first and second electrode arrangements, said at least one electrode arrangement including read-out elements for detecting electron avalanches; and an electron avalanche amplification unit provided with a cathode and an anode arranged in said space between said first and second electrode arrangements, wherein at least one of said cathode and said anode of said electron avalanche amplification unit includes a cathode or anode resistive layer.

2. The detector according to claim 1, wherein said at least one resistive layer is in contact with said gas.

3. The detector according to claim 1, wherein said at least one resistive layer is made of an ohmic material.

4. The detector according to claim 1, wherein said at least one resistive layer is diamond.

5. The detector according to claim 1, wherein said cathode and said anode are provided as strips on a same side of a dielectric substrate.

6. The detector according to claim 5, wherein said dielectric substrate acts as a carrier for said cathode and anode strips.

7. The detector according to claim 1, wherein said at least one electrode arrangement includes an anode electrode, and said anode of said electron avalanche amplification unit and said anode electrode are formed by the same member.

8. The detector according to claim 7, wherein said electron avalanche amplification unit includes a dialectric substrate located between said anode and said cathode.

9. The detector according to claim 1, wherein said at least one electrode arrangement includes an anode electrode, and said anode of said electron avalanche amplification unit and said anode electrode are formed by separate members.

10. An apparatus for use in planar beam radiography, comprising:

an X-ray source;

a substantially planar beam unit for forming a substantially planar X-ray beam positioned between said X-ray source and an object to be imaged;

a chamber filled with an ionizable gas, first and second electrode arrangements provided in said chamber with a space therebetween, said space including a conversion volume, and at least one of said first and second electrode arrangements includes at least one resistive layer facing the other of said first and second electrode arrangements, said at least one electrode arrangement including read-out elements for detecting electron avalanches; and an electron avalanche amplification unit provided with a cathode and an anode arranged in said space between said first and second electrode arrangements, wherein at least one of said cathode and said anode of said electron avalanche amplification unit includes a cathode or anode resistive layer.

11. The apparatus according to claim 10, wherein said at least one resistive layer is in contact with said gas.

12. The apparatus according to claim 10, wherein said at least one resistive layer is made of an ohmic material.

13. The apparatus according to claim 10, wherein said at least one resistive layer is diamond.

14. The apparatus according to claim 10, wherein said cathode and said anode are provided as strips on a same side of a dielectric substrate.

15. The apparatus according to claim 14, wherein said dielectric substrate acts as a carrier for said cathode and anode strips.

16. The detector according to claim 10, wherein said at least one electrode arrangement includes an anode electrode, and said anode of said electron avalanche amplification unit and said anode electrode are formed by the same member.

17. The detector according to claim 16, wherein said electron avalanche amplification unit includes a dialectric substrate located between said anode and said cathode.

18. The detector according to claim 10, wherein said at least one electrode arrangement includes an anode electrode, and said anode of said electron avalanche amplification unit and said anode electrode are formed by separate members.

* * * * *